(12) United States Patent
Gerber

(10) Patent No.: US 6,689,035 B1
(45) Date of Patent: Feb. 10, 2004

(54) METHOD AND APPARATUS FOR DESIGNING AND CREATING A PACKAGE

(75) Inventor: David J. Gerber, Vernon, CT (US)

(73) Assignee: Gerber Scientific Products, Inc., South Windsor, CT (US)

(*) Notice: Subject to any disclaimer, the term of this patent is extended or adjusted under 35 U.S.C. 154(b) by 0 days.

(21) Appl. No.: 09/547,259

(22) Filed: Apr. 11, 2000

(51) Int. Cl.⁷ ................................................ B31B 1/88
(52) U.S. Cl. ...................... 493/320; 493/321; 700/97
(58) Field of Search ......................... 493/1, 320, 321, 493/322, 323, 58, 59; 700/97, 98; 101/212

(56) References Cited

U.S. PATENT DOCUMENTS

| | | | |
|---|---|---|---|
| 1,983,323 A | | 12/1934 | Stokes |
| 3,981,213 A | | 9/1976 | Lopman |
| 4,624,169 A | | 11/1986 | Nelson |
| 4,822,325 A | | 4/1989 | Vossen |
| 5,197,198 A | | 3/1993 | Onozato |
| 5,284,164 A | * | 2/1994 | Andrews et al. |
| 5,438,896 A | | 8/1995 | Carroll |
| 5,537,135 A | | 7/1996 | Hevenor et al. |
| 5,551,786 A | | 9/1996 | Webster et al. |
| 5,575,099 A | | 11/1996 | Strobel et al. |
| 5,598,202 A | | 1/1997 | Peterson |
| 5,615,123 A | * | 3/1997 | Davidson et al. |
| 5,646,656 A | | 7/1997 | Leonhardt et al. |
| 5,671,415 A | * | 9/1997 | Hossain |
| 5,814,464 A | | 9/1998 | Davis et al. |
| 5,933,349 A | * | 8/1999 | Dalgleish et al. |
| 5,936,861 A | * | 8/1999 | Jang et al. |
| 6,002,416 A | | 12/1999 | Gerber |
| 6,090,027 A | * | 7/2000 | Brinkman |
| 6,102,536 A | * | 8/2000 | Jennel |
| 6,117,061 A | * | 9/2000 | Popat et al. |
| 6,236,409 B1 | * | 5/2001 | Hartman |
| 6,269,277 B1 | * | 7/2001 | Hershenson et al. |
| 6,418,416 B1 | * | 7/2002 | Rosenberg et al. ........... 705/28 |

* cited by examiner

Primary Examiner—Eugene Kim
(74) Attorney, Agent, or Firm—McCormick, Paulding & Huber LLP

(57) ABSTRACT

A comprehensive model design environment for creating a comprehensive model having a graphical design and a structural design includes at least two design stations and a database. Each design station comprises a graphical design module for generating signals indicative of the graphical design and a structural design module for generating signals indicative of the structural design. The database receives the graphical design and the structural design signals, and generates in accordance therewith an ordered set of signals corresponding to the graphical design and the structural design. Each of several parties which collaborate in designing a package may access the database, greatly reducing design time.

7 Claims, 6 Drawing Sheets

METHOD AND APPARATUS FOR DESIGNING AND CREATING A PACKAGE

FIELD OF THE INVENTION

The present invention relates to package design and more specifically to systems for designing and creating a comprehensive model of a package.

CROSS REFERENCE TO RELATED APPLICATIONS

Some of the subject matter herein is disclosed and claimed in the following U.S. patent application, which is incorporated herein by reference:

U.S. Patent Application entitled "METHOD FOR MAKING EMBOSSED PACKAGES AND OTHER ARTICLES FROM SHEET MATERIALS, BLANKS MADE THEREBY, AND SHEET MATERIALS FOR USE THEREWITH", filed on Mar. 27, 2000.

BACKGROUND OF THE INVENTION

Virtually all consumer products are sold in packages, such as cardboard cartons, boxes, bags and other types containers. A package has two very distinguishing features: a structural design and a graphical design. The structural design of a package is defined by the package's structural features, such as the dimensions, geometric shape and work material of the package. The graphical design of a package is defined by the colors, artwork and other images applied thereto. The graphical design preferably identifies the packaged product in a manner which is aesthetically appealing to potential consumers.

A package is typically formed from a sheet of corrugated board, carton board, or other work material upon which a graphical design is applied. The graphical design may be applied by many known processes. For example, the package may be printed with an ink-jet printing device or a vinyl sheet having a design may be laminated to the package. Many packages are printed lithographically, while still others are printed with flexographic or rotogravure techniques. Small-format, high-value-added folding cartons often include hot stamped metallic foils and/or embossed designs.

The applied graphical design may be simple, such as those created with normally printed ink or vinyl, or more complex, such as prismatic or holographic images. Flexible packages such as bags and wrappers may incorporate holographic, pearlescent or prismatic effects even for inexpensive packaged goods such as toys and candy. Many packages furthermore require special colors, and roughly two-thirds of all packages require spot color, typically a Pantone color. Although only about a third of packages require process-color photographic images, dot-based patterns are commonly used for vignettes.

Finishing operations such as cutting and creasing transform the sheet of work material into a package having a desired structural design. Cutting and creasing corrugated and folding cartons is an expensive process which necessitates the production of steel rule dies, counter-cutters and other tools. Further operations may add additional features to the package, such as operations which add embossing, labels, stickers, windows or blister packs. These additional operations increase the cost of producing the package.

Although there are numerous types of packages in existence today, new packages are constantly being designed and created. The great demand for new packages is due in part to common activities such as launching new products, re-launching an existing product, providing an existing product with a new identity, introducing new sizes of an existing product or extending a range of a product line. Further demand for new packages arises from the desire to reduce the costs of existing packages. Finally, many companies are aiming at increasingly smaller market niches, a marketing strategy which requires more careful product development and marketing, and thus more specialized packages.

Designing a package is a precise process requiring consideration of competing goals: aesthetic appeal and minimal cost. The most appealing package design may be prohibitively expensive, perhaps even more expensive than the product to be packaged. Several parties must collaborate closely in order to-design a desired package which is both inexpensive to produce and appealing to potential customers. Parties who are involved in the design of a package include Print Buyers, Graphic Designers, Separators and Converters.

A Print Buyer is the party who desires a package. The typical Print Buyer is a consumer goods company which requires a package to contain and promote its product. The Print Buyer (and/or their advertising agency or marketing consultant) define the desired "message", and thus the preferred "image", of the packaged product. This message serves as a broad package design specification.

A Graphic Designer is a specialist in the field of artistic design who is charged with creating the graphical design for the package and refining the packaged product's image. The Graphic Designer is hired directly by the Print Buyer or indirectly by an agent of the Print Buyer, such as an independent design firm dedicated to package design. The Graphic Designer creates the graphical design in the form of computer-based images and printed or digital color specifications.

A Separator, typically a trade shop or commercial printer, provides production-ready, color-separated films by combining images, text, and layout specifications provided by the Graphic Designer. The films are used in printing the graphical design on produced packages. Once the Separator has provided these films, a Converter prints and die-cuts the final package. Many Converters produce their own printing plates and die-cutting plates, including nesting and sample-cutting plates. Other Converters outsource these services to tool-shops.

Unfortunately, the parties who must collaborate typically do not have a thorough understanding of the tasks of the other parties. This greatly complicates the process of designing a package, driving up costs and total design time. As may be. seen from the description provided hereinafter, the conventional package design process is slow and repetitive. The process of designing a package is even more time-consuming and costly if collaboration between the parties is weak.

Prior art systems for designing a package start with the desires of the Pint Buyer. Since the Print Buyer is almost always a company, rather than an individual, the step of establishing desirable package features involves coopertion among many departments, such as product purchasing, quality control, merchandising, retail marketing, distribution, and legal counsel. Once the Print Buyer establishes desirable package features, the Print Buyer's package specialist and package buyer produce a Package Design Brief based on these features.

Generally, the Package Design Brief is a set of goals for guiding the Graphic Designer in creating the graphic design of the package. The Package Design Brief generally provides the following information:

the underlying objective of the packaged product;

the product type, such as a major design project (e.g., launching a new product), a line extension (e.g., introducing a new size or adding to the product range) or a minor image modification (e.g., re-launching the same product);

any special requirements (e.g., legislation or regulations covering the subject. product or package, environmental considerations, any preferred colors or package considerations, space and display requirements, number of options, chemical, physical and distribution requirements, and special promotional requirements);

essential copy information to be included (e.g., brand name, product names, size, capacity or weight, unique selling points, care and use instructions, any legal copy required and appropriate recycling symbol); and a brief review of the competition in order to provide such information as other types of packages and accepted colors.

In certain circumstances, the Package Design Brief is intentionally drafted broadly to afford greater latitude to the Graphic Designer. In such a case, the Print Buyer effectively leaves control of major marketing decisions to an outside agency. However, the Print Buyer may want the Graphic. Designer, who probably has more experience in package design, to assume greater responsibility for managing the package design process.

Once a Package Design Brief is drafted and approved, the Print Buyer considers different options for the package's structural design. Such factors as the estimated quantities, retail price, development budget and launch date of the packaged product are taken into account in determining a final structural design. Further considerations in selecting a structural design are whether material will be efficiently utilized, since packages will eventually be produced in large numbers on a printing press and a die-cutting press.

Even after both a desired graphical design and a desired structural design are selected, final production of the packages is not yet appropriate. The desired graphical design and structural design which the Print Buyer selects may dictate a package which is prohibitively expensive or even impossible to produce. Other types of incompatibilities between the desired graphical design and the desired structural design may exist as well. To determine if the desired graphical and structural designs are sound, the Print Buyer must receive feedback from the other parties in the design process who are more knowledgeable in their own specialties.

To facilitate the process of providing feedback and approval of package designs, the parties in the design process exchange physical samples which embody the package design. These samples, known as comprehensives or "comps", are three-dimensional models of the proposed package with a graphical design applied thereto. The comps provide a realistic, concrete medium for visualizing, communicating and evaluating interrelated graphical and structural implications of a proposed package design. Throughout the entire package development process, comments, revisions and ultimately approvals are provided with reference to the comps. These comments, revisions and approvals are reduced to writing and maintained in forms and folders of the various parties.

Comps are prepared by the Graphic Designer based on structural templates. The structural templates are typically selected and provided by the Converter, who has a knowledge of structural designs so that he may plan for appropriate die-cutting. The comps are put forward for the Print Buyer's amendment and final approval. Several iterations of comp production are almost always necessary before the Print Buyer approves of a final package design. In fact, between fifteen and twenty unique comps are usually prepared for each approved design, with each comp typically costing between $350 and $700.

As with most graphical illustrations, graphic designs for comps are typically created on Apple™ Macintosh™ computers, using industry standard Postscript-based software such as Adobe Illustrator™, Quark Xpress™, Adobe Photoshop™ and Aldus Freehand™. The graphical designs are printed onto paper or similar stock using digital, low-to-medium-quality, inexpensive desktop proofing systems such as ink jet printers. Such proofing systems provide only an approximate representation of colors, forcing Print Buyers to imagine the intended colors and graphical effects for finished packages. Comps are then created manually by laminating these proofs to cardboard, scoring the reverse side of the cardboard along the intended fold lines, and cutting the laminate. In many circumstances, producing comps obviates the need to wet color proof.

In contrast to graphical designs, which are embodied by one or more comps, structural designs are embodied, evaluated and communicated in the form of blank structural samples produced from proposed production material. These structural samples are typically prepared by the Converter, or less often by the Print Buyer, for evaluating structural integrity, mechanical operation, production feasibility and other issues concerning product housing, distribution and display. As with comps, structural samples are usually put forward for the Print Buyer's review, amendment and final approval, typically after several iterations.

Structural samples are typically designed on PC-compatible workstations, using various industry computer-aided design (CAD) software, such as AutoCAD™ or similar products which are tailored for box design. Designers typically retrieve from extensive software libraries a pre-existing structural design which serves as a model for the structural design of the package. Structural samples are produced using large flat-bed vacuum-holddown tables which cut and crease sheets of work material. Although these samples typically are blank, sample-maker tables are increasingly being used to produce printed structural samples. Converters sometimes use their sample-maker tables to cut and crease material which has been pre-printed or laminated with a pre-printed skin, accepting a surprising degree of inefficiency due to existing registration systems. Some sample-maker tables offer optional ink jet heads for printing. However, the resulting print quality and efficiency is poor, so ink jet heads are for the most part limited to use with corrugated packages, where print quality is less important.

Because packages are printed and die-cut from large sheets or rolls of material, printing plates and steel rule dies must be designed for an optimal production layout which minimizes production costs. Accordingly, after establishing a production-approved structural design, the Converter produces a digital "nest" defining a preferred layout. This nest is used in driving equipment which produces a steel rule die, routed countercutters and related tools, and a plotter for plotting an acetate marker. The acetate marker is supplied to the Separator for layout purposes, with all players continuing to play an integral role.

The Separator performs color separations and other pre-press operations with assistance from the Graphic Designer and Converter. Generally, Print Buyers and Graphic Designers will change (retouch) an image after it has been scanned. Retouching requires both technical skill and artistry. In addition to traditional retouching methods involving transparencies, it has become common for Separators to do digital retouching on their medium-to-high-quality Color Electronic Prepress Systems (CEPS) and filmless digital proofing systems, such as a 3M Digital Matchprint™ and Kodak Approval™. Such prepress and proofing systems are often calibrated to match actual press running conditions.

Due to continually improving technology, it is also possible for Graphic Designers to digitally retouch the graphical design on a desktop computer system. Graphic Designers believe that they should, as a minimum, supervise any retouching associated with their design projects. Where low resolution is used, the retouched graphical design serves as only a model for the Separator to use in creating a high resolution graphical design. However, high resolution graphical images may be created if the Graphic Designer is equipped to handle very large digital image files.

Finally, press proofs are made by the Converter using conventional proofing processes and techniques with actual inks on actual substrates. Although high-quality CEPS have the potential to replace press proofing for some applications, conventional press proofs are inapplicable to some projects, such as those requiring special colors. This technique is still commonly used because of the dominance of spot colors and special effects used in packages. While short-run printing of folding carton stock is becoming economically feasible with smaller presses or new digital printing technology, there is a significant demand for short-run production of corrugated displays and folding cartons for special, promotional or test marketing applications.

As is clear from the above description, the process of designing packages is not well automated. In fact, even straight-forward automation of most steps will not alleviate the most significant problems with the process. For example, replacing pen-and-paper with computer graphics software does not reduce the significant delays which result from the collaboration between the parties. It would be advantageous to have a system which completely managed the design of packages.

SUMMARY OF THE INVENTION

An object of the present invention is to provide a system for designing a package in which parties may efficiently exchange package design information.

Another object of the present invention is to provide a system for designing and creating comprehensive models of a package.

In accordance with the present invention, a comprehensive model design environment for creating a comprehensive model having a graphical design and a structural design comprises at least two design stations and a database. Each design station comprises a graphical design module for generating signals indicative of the graphical design and a structural design module for generating signals indicative of the structural design. The database receives the graphical design and the structural design signals, and generates in accordance therewith an ordered set of signals corresponding to the graphical design and the structural design.

DESCRIPTION OF PREFERRED EMBODIMENT

The following glossary defines terms used herein.

Comp
  Also known as a "comprehensive", a comp is a three-dimensional model of a proposed package design.
Converter
  A party who prints and die-cuts the final package.
Graphical Design
  The colors, artwork and other images applied to a package.
Graphic Designer
  A party employed by a Print Buyers to create a package's graphical design.
Overprinting
  The ability to obtain a plurality of continuous solid (non-process) colors by thermally overprinting from a smaller number of differently colored foils or foil sections.
Package Design
  A structural design and a graphical design of a package.
Package Design Brief
  A written set of goals for guiding the Graphic Designer in creating the graphic design of the package.
Print Buyer
  Typically consumer goods companies who require designed packages to contain and promote their products.
Separator
  A party who provides final, color-separated films:for a package by combining images, text, and layout specifications provided by the Graphic Designer.
Structural Design
  The form and shape of a package.
Structural Features
  Individual features, such as the dimensions, geometric shape and work material of a package, which define the form and shape of the package.
Structural Samples
  Blank models produced from proposed production material of a package.
Work Material
  The material from which a package is formed.

The system for designing and creating comprehensive models provided in accordance with the present invention brings Graphic Designers, Separators, Converters and Print Buyers together in a close and interrelated working relationship much more efficiently than conventional package design systems. The system of the present invention will be contrasted with the prior art to clarify the advantages of the invention.

Figure 1:
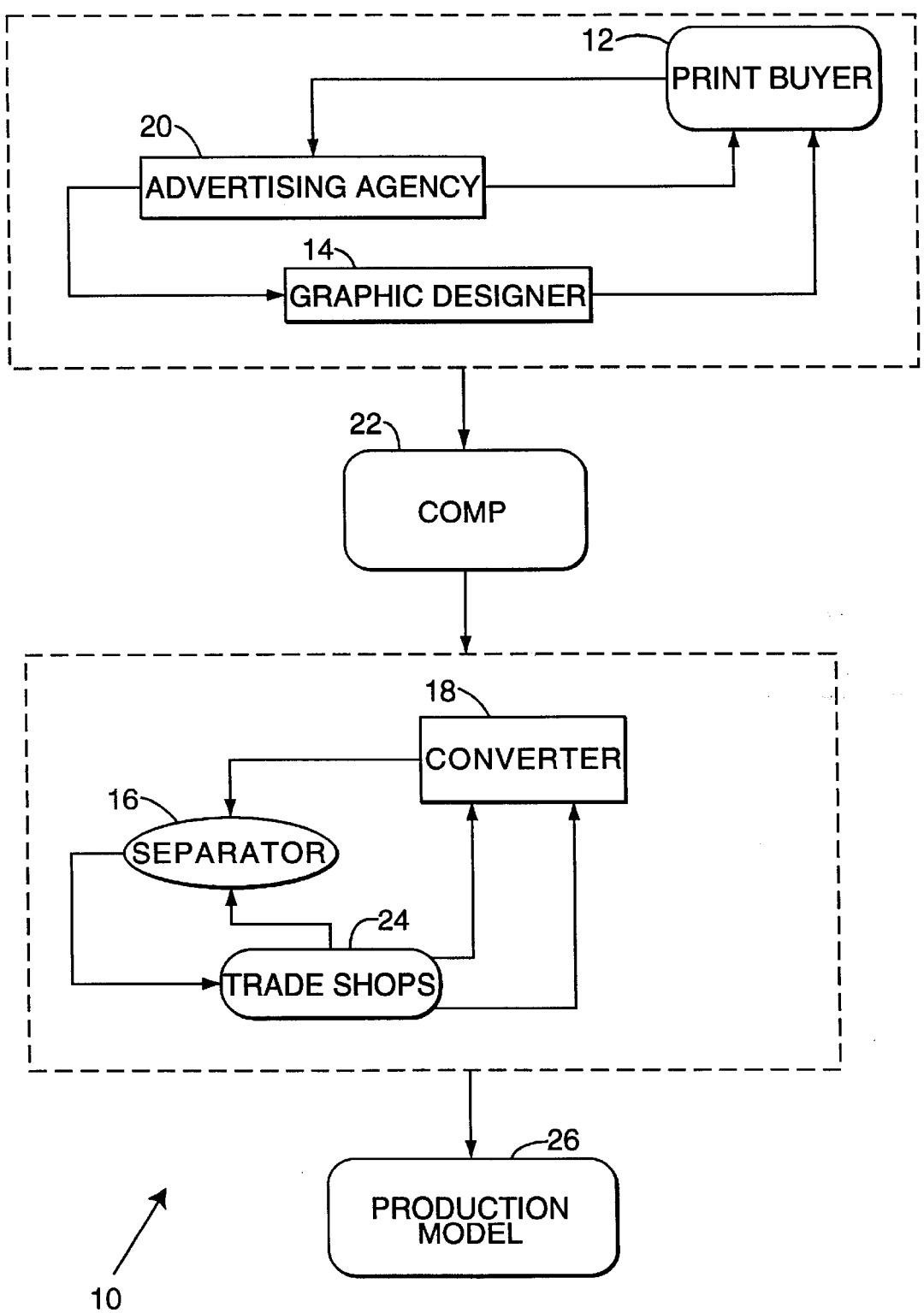
FIG. 1 is a schematic illustration of the flow of work between the main parties to a package design process in prior art systems.

As illustrated by FIG. 1, prior art systems for designing and creating packages are extremely limited by the flow of communication and work product between the four main parties in the design process: the Print Buyer, Graphic Artist, Separator and Converter. In this prior art system 10, the parties 12, 14, 16 and 18 directly and indirectly exchange digital (computer-based) files of art and reproduction, computer-aided design (CAD) specifications and computer-aided manufacture (CAM) specifications. Through this exchange, the package design, as well as the digital files corresponding to the design, is frequently revised and transformed. The end result of this exchange is a final, approved three-dimensional, high-quality package design. The entire design process preferably takes under two weeks, since design delays result in lost product sales. The parties must work long days during that two weeks to satisfy these narrow time constraints.

As described in more detail hereinabove, the Print Buyer 12 and/or its Advertising Agency 20 prepare a package design brief to guide the Graphic Designer 14. The Graphic Designer 14 creates a comp 22 which embodies a proposed graphic design to be reviewed by the Print Buyer 12. However, the Separator 16, Converter 18 and other trade shops 24 involved in package production may determine that the proposed graphic design is invalid (i.e. too expensive or impossible to produce). Similarly, once the Converter 18 prepares a structural sample embodying the proposed structural design, the Print Buyer 12 may desire a different structural design. A final production model 26 may only be created once all design decisions are finalized and approved.

This highly linear flow of work may be determined from the arrows in FIG. 1 which show the flow of communication between the parties. Note that FIG. 1 illustrates the flow of work, not the steps of a process, which will be presented hereinbelow. The linear flow of work in prior art systems acts as a bottleneck in the design process, extending design time and impeding the detection and correction of design errors.

Figure 2:
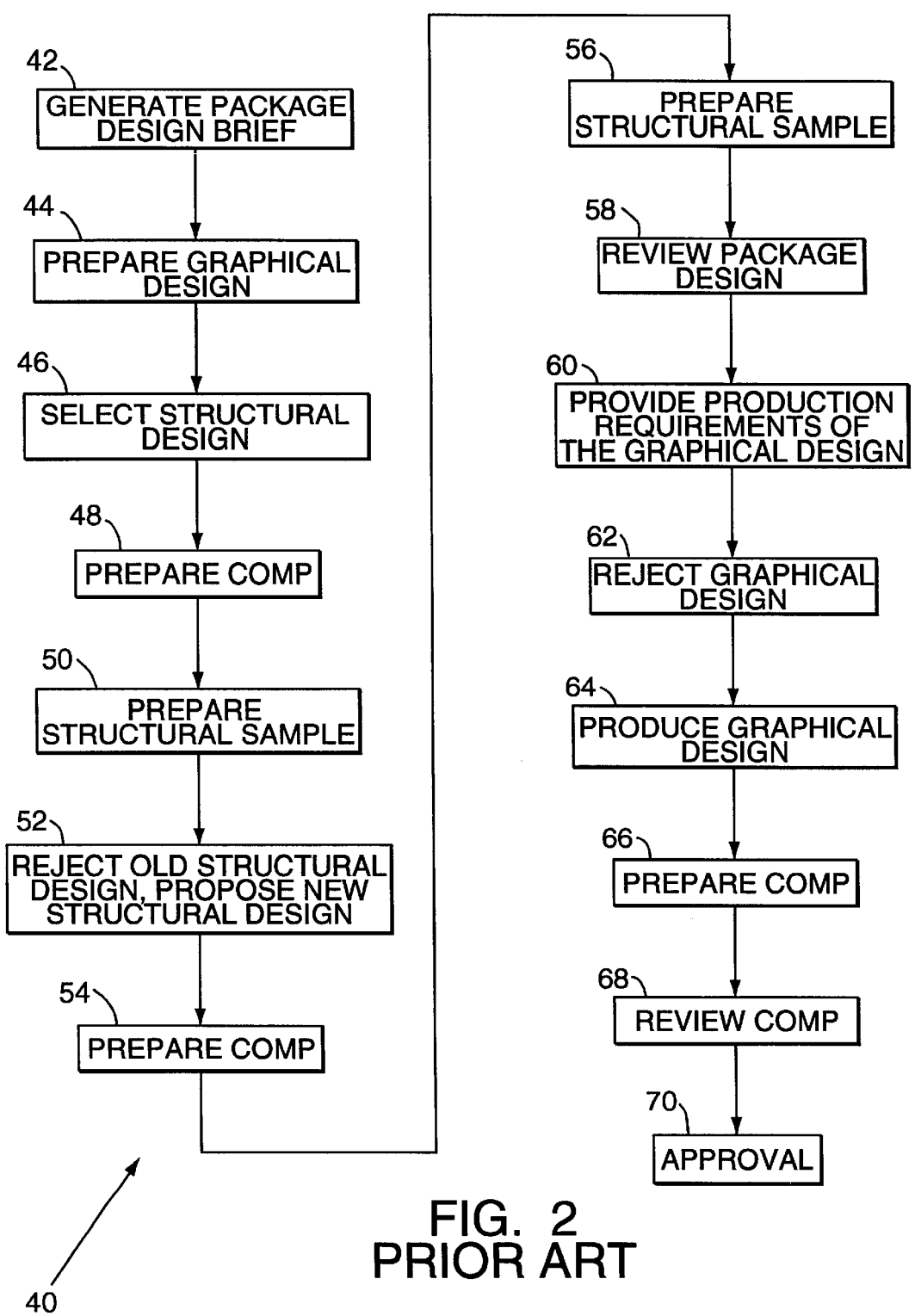
FIG. 2 is a schematic illustration of a sample process which illustrates prior art systems for designing and creating a package.

FIG. 2 is a schematic illustration of an exemplary process 40 illustrating prior art systems for designing and creating a package. The Print Buyer initiates the design process 40 by generating a package design brief for the Graphic Designer (step 42). The Graphic Designer prepares a proposed graphical design in accordance with the design brief (step 44). The Print Buyer also selects a structural design for the package (step 46), allowing the Graphic Designer to prepare a comp in accordance therewith (step 48). Similarly, the Converter prepares a structural sample for the Print Buyer's review (step 50). Upon reviewing the comp, the Print Buyer may decide that the proposed structural design does not fit the product's image well, and a new structural design is proposed (step 52). This, of course, requires that the Graphic Designer prepare a new comp (step 54) and that the Converter prepare a new structural sample (step 56). To determine the ramifications of the graphical and structural designs, the Converter reviews the proposed package design (step 58) and the Separator provides feedback on production requirements of the graphical design (step 60). If the Separator determines that the proposed graphical design involves a complex arrangement of films, the Print Buyer may reject the graphical design as too costly (step 62). After a new graphic design is produced (step 64), a new comp is generated (step 66) and reviewed by the Print Buyer (step 68). This proposed package design is finally approved by the Print Buyer (step 70).

As described hereinabove, the design of a package usually requires many more iterations than shown in the process 40 of FIG. 2. Even worse, because each comp and structural sample must be physically presented to the Print Buyer for approval, there are unavoidable delays while these comps and structural samples are mailed to the Print Buyer. By contrast, the system provided in accordance with the present invention allows quicker revisions to proposed designs, quicker creation of package samples before final assembly, all at a savings in time and money.

Figure 3:
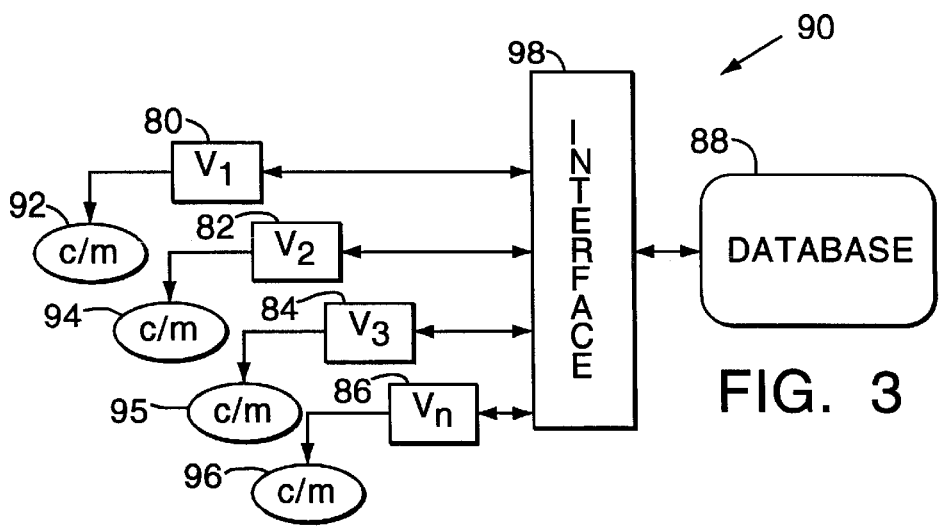
FIG. 3 is a schematic illustration of a system for designing packages provided in accordance with the present invention.

FIG. 3 is a schematic illustration of a system 90 for designing packages provided in accordance with the present invention. The system 90 include's a plurality of design stations 80, 82, 84, 86. Each station is used by a party in the package design process, and each station is linked with a central database 88 through a database interface 98. The interface 98 is preferably a graphical user interface (GUI) which prompts the user of a station for database input and provides database output to the user. The database 88 stores an ordered set of signals indicative of at least one structural and graphical design of a package. As will be seen from the description presented hereinbelow, these designs are the result of a collaboration between the parties which is stronger and more efficient than any collaboration possible in prior art systems.

Because each station is linked to the database 88, each station can both retrieve from the database 88 and store in the database 88 signals indicative of a package design. Typically, each station will at least retrieve package design signals from the database. For example, the Print Buyer will at the very least retrieve signals indicative of each revison of a proposed package design so that he may review the package design. Other stations will further generate and store package design signals. For example, the Graphic Designer will create a graphical design with the station, which generates signals indicative of the graphical design and forwards these signals to the database 88 for storage.

A station which receives package design signals from the database 88 can generate an image in accordance with the package design using known software methods. Each of the stations 80, 82, 84 and 86 furthermore communicates with a device which creates a model, or comp, corresponding to the package design. For example, in FIG. 3 a comp-generating device 92 (also known as a comp-maker) is in signal communication with the station 80. Similarly, stations 82, 84 and 86 communicate respectively with comp-makers 94, 95 and 96. The station 80 may be the Print Buyer's station, and thus the comp-maker 92 allows the Print Buyer to view a physical object embodying the package design. Such a comp-maker eliminates the need to mail or otherwise physically deliver a comp to the Print Buyer, saving hours or even days in the package design and approval process. Thus, the package design system provided in accordance with the present invention allows the Print Buyer to thoroughly review (proof) a package design without another party having to create and deliver a comp. The Print Buyer need only retrieve signals from the database 88.

Each comp-maker comprises a printing mechanism, a processing mechanism and a comprehensive fabrication apparatus controller. The printing mechanism receives and prints a graphic image on a laminated web, and preferably includes a first roller platen rotatably mounted on a first frame for supporting and moving the laminated web, a print head for printing graphic images on the laminated web, and mounted on the first frame adjacent to the roller with the laminated web passing between the print head and the first roller platen, and a first advancing mechanism for moving the laminated web back and forth in a first coordinate direction extending longitudinally across the web through the printing mechanism during a printing operation.

The processing mechanism receives and performs work operations on the laminated web. The processing mechanism includes a second frame, a tool head slidingly supported on the second frame for movement relative to the frame in a second coordinate direction perpendicular to the first coordinate direction, and selectively movable between an elevated non-working position and a lowered working position, at least one tool holder mounted to the tool head, at least two processing implements, a second roller platen rotatably mounted on the second frame over which the laminated web passes and a second advancing mechanism for moving the laminated web back and forth in the first coordinate direction through the processing mechanism during the work operations. One processing implement is a knife for cutting a package blank from the laminated web, and the other is a creasing tool for making lines of indentation corresponding to fold lines in the package blank. The processing implements are carried by the tool holder and oriented above the laminated web.

The comprehensive fabrication apparatus controller is in communication with the first and second advancing mechanisms, the printer mechanism, and the processing mechanism. The controller directs the advancement of, printing of, and work operations performed on the laminated web in response to the comprehensive model command signals.

In the preferred embodiment, the database 88 stores signals indicative of a plurality of package designs. For example, each revision of a proposed design would be represented in the database 88, allowing strict control of revisions, as well as reuse of related package designs (i.e. for product line enhancement or expansion). The database 88 further stores signals indicative of information which is related to the process of designing a package, such as cost estimates and bills of materials.

Figure 4:
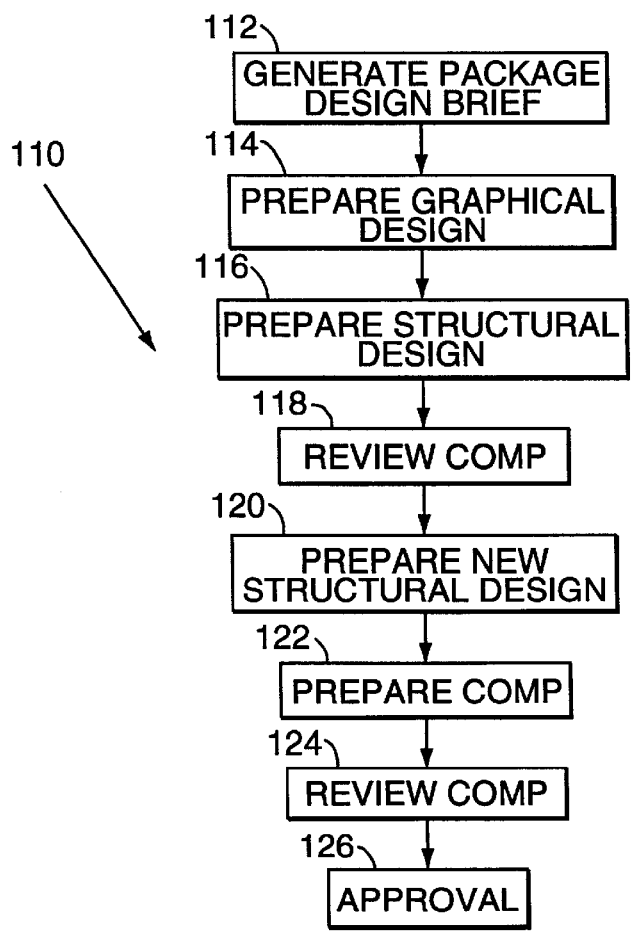
FIG. 4 is a schematic illustration of a sample process illustrating a system for designing packages provided in accordance with the present invention.

FIG. 4 is a schematic illustration of a sample process 110 which illustrates a system for designing packages provided in accordance with the present invention. The Print Buyer initiates the design process 110 by generating a package design brief for the Graphic Designer (step 112). The Graphic Designer prepares a proposed graphical design in accordance with the design brief (step 114). The Print Buyer also selects a structural design for the package (step 116). At this point, the central database stores signals indicative of a package design, and therefore, signals indicative of a comp which the Print Buyer may review (step 118). Upon reviewing the comp, the Print Buyer may decide that the proposed structural design does not fit the product's image well, and a new structural design is proposed (step 120). This, of course, immediately allows the Print Buyer to generate a new comp (step 122) which he reviews (step 124). This proposed package design is finally approved by the Print Buyer (step 126).

Although the steps in the process 110 may seem similar to those of the process 40 in FIG. 2, the time between the steps illustrated in FIG. 4 are much shorter. For example, it may be only a matter of minutes between preparation of the graphical design (step 114) and review of a comp embodying the package design (step 118). By contrast, in prior art systems the interval between comparable steps may be as long as a few days.

Figure 5:
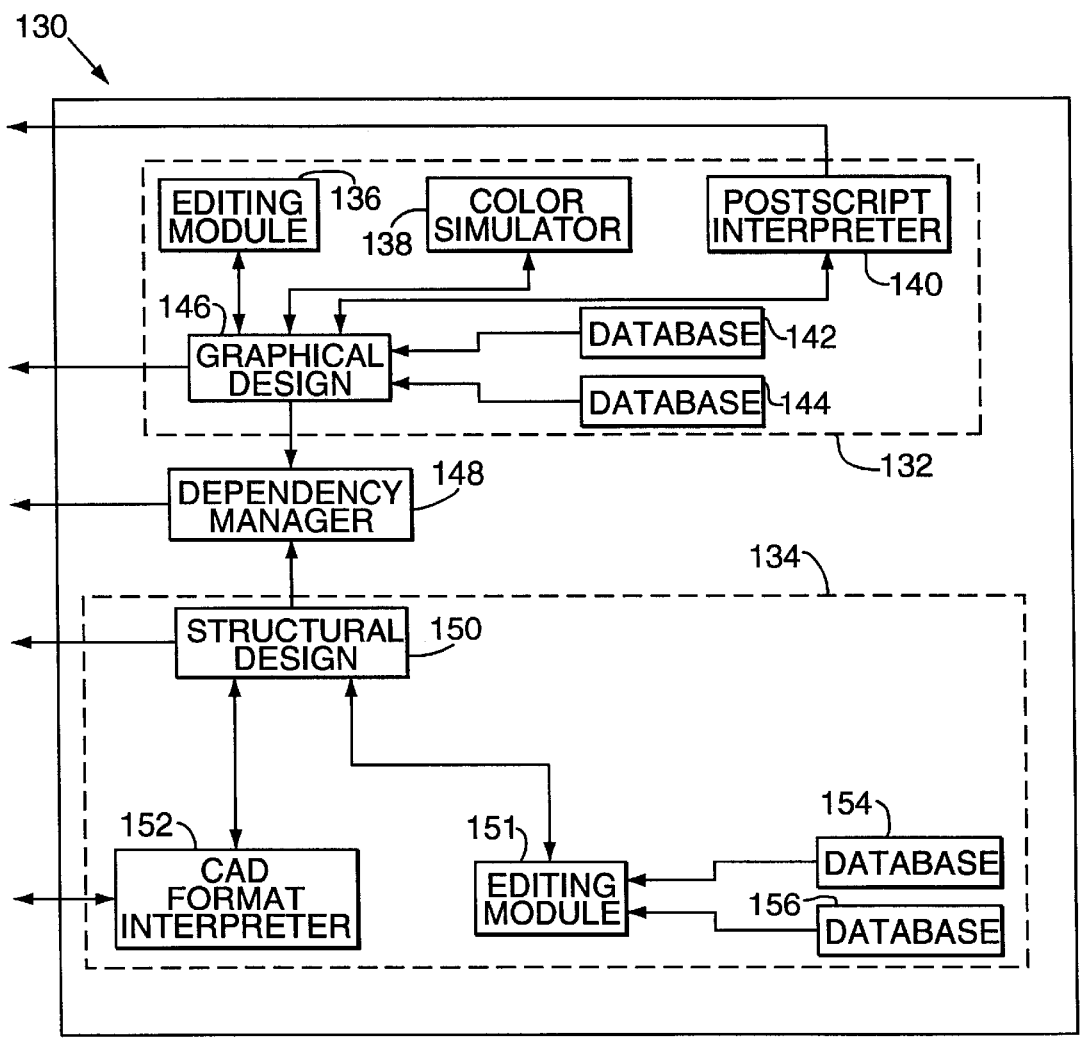
FIG. 5 is a detailed schematic illustration of a design station of the system for designing packages of FIG. 3.

FIG. 5 is a detailed schematic illustration of an embodiment of a design station 130 included in the system for designing packages of FIG. 3. The station 130 includes a graphical design module 132, a structural design module 134 and a dependency manager 148. The graphical design module 132 generates signals indicative of a graphical design, and similarly the structural design module 134 generates signals indicative of a structural design. The dependency manager 148 receives the graphical design signals and the structural design signals, and generates therefrom signals indicative of any conflicts between the graphical design and the structural design. For example, the graphical design may not fit on a package embodying the structural design.

The graphical design module 132 includes an editing module 136 for performing transformations on the graphical design, such as rotating, translating or scaling portions of the graphical design. The editing module 136 thus generates signals indicative of a second graphical design in response to signals indicative of a first graphical design, in which the second graphical design comprises a modification to the first graphical design. The graphical design module 132 further includes a color simulator 138 for calculating and generating signals indicative of special color effects in the graphical design, such as spot colors, metallic colors or holographic effects. A PostScript interpreter 140 is a translator which allows the graphical design module 132 to both understand and generate PostScript-based images, as do many software tools in the graphic arts field. Finally, two databases 142 and 144 provide templates of standard graphical designs and design elements. The database 142 provides templates which are parametric, i.e. the templates have one or more associated parameters which affect the graphical design in the template. For example, a square is a simple graphic element which has a parameter, the length of each side of the square. Parametric templates are easily modifiable, and therefore highly flexible and adaptable. The database 144 provides templates which are not parametric, such as bitmapped images and textures. Each of the above mentioned elements 136, 138, 140, 142, 144 provide signals to a storage area 146 for storing signals indicative of the graphical design.

The structural design module 134 includes two databases 154 and 156 which provide templates of standard structural designs. Much like the databases of the graphical design module 132, the databases 154 and 156 store parametric and non-parametric structural templates. The structural design module 134 further includes a Computer-Aided Design (CAD) interpreter 152 for allowing the structural design module 134 to both translate and generate CAD-based structural designs, as do many software tools. In addition, an editing module 151 is provided for performing transformations on the structural design. The module 151 thus generates signals indicative of a second structural design in response to signals indicative of a first structural design, in which the second structural design comprises a modification to the first structural design. Each of the above mentioned elements 151, 152, 154, 156 provide signals to a storage area 150 for storing signals indicative of the structural design.

Figure 6:
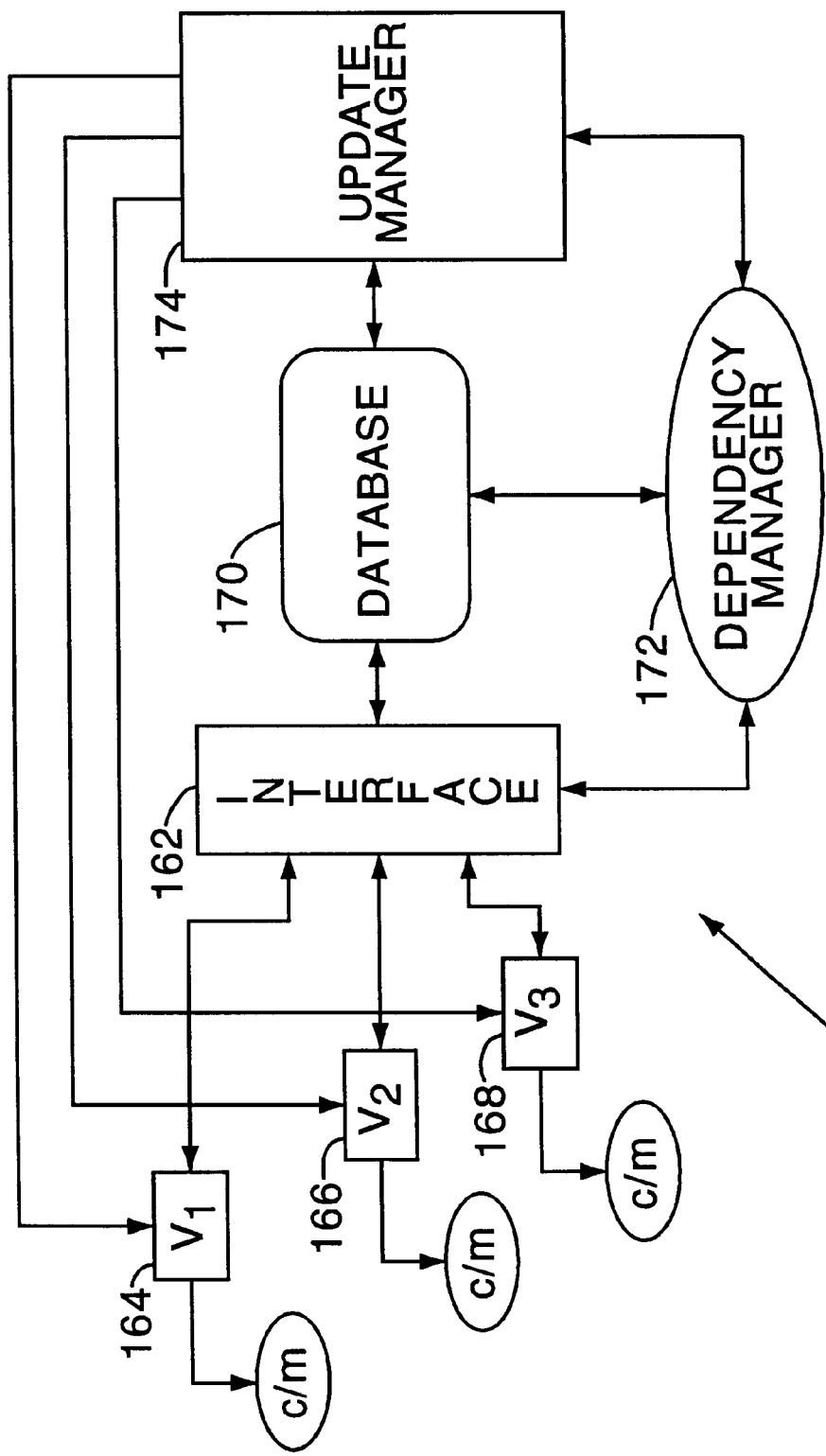
FIG. 6 is a schematic illustration of another embodiment of a system for designing packages provided in accordance with the present invention.

In the embodiment illustrated in FIG. 5, the dependency manager 148 is a part of the design station. However, those skilled in the art will understand that the dependency manager 148 may be a single module with which each station is in signal communication. Such an alternative embodiment is illustrated in FIG. 6. A system 160 includes an interface 162 which manages the communication between design stations 164,166, 168 and a database 170. An update manager 174 communicates with the design stations 164,166, 168 when one or more stations has changed a portion of a package design. In other words, the update manager 174 notifies the stations of the change that has occurred. Based on this change, a dependency manager 172 calculates other needed changes to the package design and notifies the stations of the same.

Figure 7:
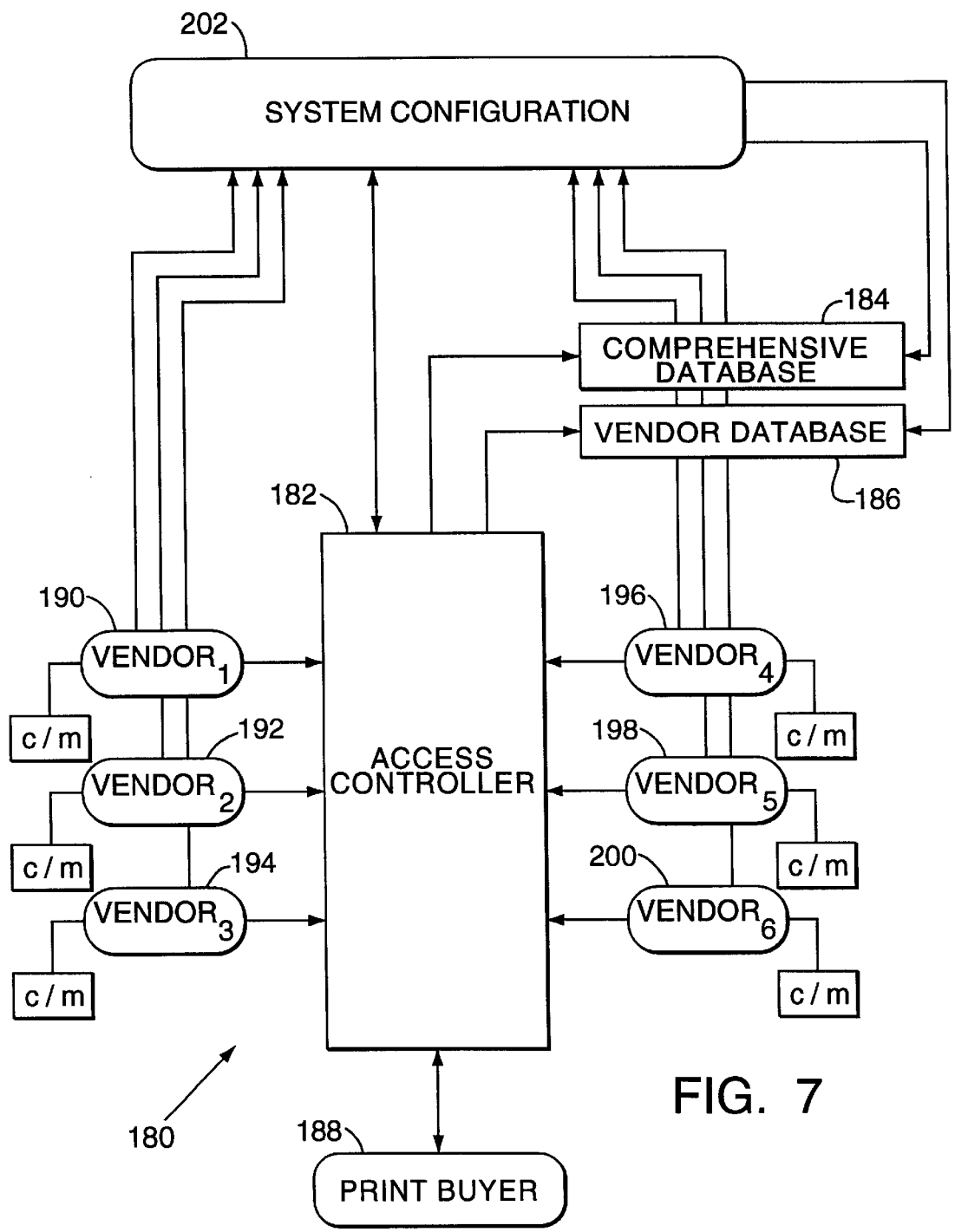
FIG. 7 is a schematic illustration of still another embodiment of a system for designing packages provided in accordance with the present invention.

FIG. 7 illustrates another embodiment of the present invention. The system 180 includes an access controller 182 which manages access to databases 184, 186 by the print buyer 188 and vendors 190,192,194,196, 198, 200. The access controller 182 compares signals stored in the databases 184,186 with signals corresponding to a comprehensive model template. After this comparison, the access controller 182 generates signals to inform a vendor of the compliance of vendor parameter with the template. The access controller further provides an interface, such as a graphical user interface, for such tasks as prompting vendors to enter comprehensive model data, informing vendors when more comprehensive model data is required, and informing vendors of the comprehensive model data entered, such as a graphical depiction of the entered comprehensive model. The database 184 stores signals indicative of package design information, while the database 186 stores signals indicative of vendor information, such as each vendor's access privileges. Finally, a system controller 202 directs both the operation of the access controller 182 and the operation of the databases 184, 186.

Existing software and hardware products are preferably included in implementing the system of the present invention. For example, a great number of graphical design products are available, such as Artworks™ by Gerber Garment Technology, Inc., Adobe Illustrator™, Quark Xpress™ and Adobe Photoshop™.

A device which may be used in applying a graphical design to comps is the GERBER EDGE™ thermal printer. The GERBER EDGE™ thermal printer is capable of printing spot colors, including Pantone and other special colors, through overprinting and other techniques. It can also print metallic and holographic effects, and medium-to-high quality dot-based images requiring dye sublimation foils.

Another device which may be suitable for applying a graphical design to comps is the GERBER MAXX™ thermal printer. The following U.S. Patent Applications relate to the GERBER MAXX™ thermal printer and are herein incorporated by reference: U.S. patent application Ser. No.: 09/288,261, filed Apr. 8, 1999 and entitled "Vacuum Workbed"; U.S. patent application Ser. No.: 09/288,277, filed Apr. 8, 1999 and entitled: "Thermal Printhead With Memory"; U.S. patent application Ser. No.: 09/288,361, filed Apr. 8, 1999 and entitled "Replaceable Donor Sheet Assembly With Memory For Use With A Thermal Printer"; U.S. patent application Ser. No.: 09/288,424, filed Apr. 8, 1999 and entitled "Wide Format Thermal Printer"; U.S. patent application Ser. No.: 09/288,428, filed Apr. 8, 1999 and entitled "Method And Apparatus For Improved Thermal Printing"; and U.S. patent application Ser. No.: 09/288,278, filed Apr. 8, 1999 and entitled "Method And Apparatus For Alignment Of Sheet Material For Printing Or Performing Other Work Operations Thereon."

A device for cutting, creasing and embossing comps is an HS-1 plotter™ driven by GRAPHIX ADVANTAGE Plot™ software.

Appropriate materials must be used in order to produce comps which simulate the color, look, feel, weight, visual effects, and texture of final production packages. For simulating the weight, feel and look of production packaging, comps are preferably made from substrates such as folding carton and flexible packaging. For simulating textures, comps are preferably printed with GerberColor textures such as glossy and matte. For simulating hot stamp foils, comps are preferably printed with GerberColor shiny and dull metallics and specialty effects such as holographics, prismatics, pearlescents and flourescents. For simulating process color and certain vignettes, comps are preferably printed with dye sublimation foils, preferably banded process-color dye sublimation ribbon. To simulate production printing of a wide range of spot color, comps are preferably printed with spot foils through the overprinting process.

Finally, information and work flow management is preferably implemented with Gerber Garment Technology's Product Data Management (PDM™) software. PDM™ software allows networked computers to selectively share and organize various digital files. This software further provides secure, authorized access to information, promoting rapid communication internally and with parties. In addition, through its integrated "Picture Portfolio", PDM furthermore enables parties to organize and secure thousands of images for an entire packaging line. Users may quickly locate concept sketches, foil and substrate images, and packaging images with powerful organizational and keyword search capabilities; create image order with Picture Portfolio's relational-database image embedding; manage vendor items and design and merchandise packaging in a state-of-the-art environment.

Although the invention has been described herein with respect to the preferred embodiment, it will be understood by those skilled in the art that various changes and modifications may be made without departing from the spirit and scope of the present invention.

What is claimed is:

1. A system for providing, for a product package, signals corresponding to a comprehensive model having comprehensive model parameters, the system comprising:

a plurality of design stations associated with corresponding vendors each contributing to a different aspect of the comprehensive model relative to other vendors;

interface means communicating with the plurality of design stations for generating signals to elicit, from a vendor of one design aspect of the comprehensive model, signals indicative of the comprehensive model parameters;

a database communicating with the interface means for receiving comprehensive model parameter signals and storing signals corresponding to ordered comprehensive model parameters; and a comprehensive model signal generator for receiving said ordered comprehensive model parameter signals and computing therefrom comprehensive model command signals, said comprehensive model signal generator communicating with the interface means to permit said comprehensive model command signals to be available to vendors of other design aspects of the comprehensive model.

2. The system of claim 1 further comprising a comprehensive fabrication apparatus for making printed package blanks from a laminated web in response to received comprehensive model command signals.

3. The system of claim 2 wherein said comprehensive fabrication apparatus further comprises:

a printing mechanism for receiving and printing a graphic image on said laminated web, said printing mechanism having a first roller platen rotatably mounted on a first frame for supporting and moving said laminated web, a print head for printing graphic images on said laminated web, and mounted on said first frame adjacent to said roller with said laminated web passing between said print head and said first roller platen, and a first advancing means for moving said laminated web back and forth in a first coordinate direction extending longitudinally of said web through said printing mechanism during a printing operation;

a processing mechanism for receiving and performing work operations on said laminated web, and having a second frame, a tool head slidingly supported on said second frame for movement relative to said frame in a second coordinate direction perpendicular to said first coordinate direction, and selectively movable between an elevated non-working position and a lowered working position, at least one tool holder mounted to said tool head, at least two processing implements, one of which is a knife for cutting a package blank from said laminated web and the other of which is a creasing tool for making lines of indentation corresponding to fold lines in said package blank, said processing implements being carried by said tool holder and oriented above said laminated web, a second roller platen rotatably mounted on said second frame over which said laminated web passes, and a second advancing means for moving said laminated web back and forth in said first coordinate direction through said processing mechanism during said work operations; and a comprehensive fabrication apparatus controller in communication with said first and second advancing means, said printer mechanism, and said processing mechanism for controlling, in response to said comprehensive model command signals, the advancement of, printing of, and work operations performed on said laminated web.

4. The system of claim 2 further comprising a means for providing publication signals for use by the vendors that are indicative of the current values of ordered comprehensive model parameter signals.

5. The system of claim 4 further comprising a system controller in communication with said interface means, said database and said comprehensive model signal generator, said controller for determining from the current values of said ordered comprehensive database model parameter signals and signals indicative of preferred criteria for said comprehensive model, vendor update signals for presentation to said interface means.

6. The system of claim 4 wherein said database further comprises:

a comprehensive model parameter database for storing said signals corresponding to said ordered comprehensive model parameters; and a vendor parameter database for receiving a first set of database parameter signals and storing signals corresponding to ordered vendor parameters.

7. The system of claim 6 wherein said system controller further comprises an access control means including:

means for maintaining said databases including a means for comparing database signals with signals corresponding to a comprehensive model template and generating therefrom signals to inform a vendor of the compliance of the parameter signals with the template signals;

means for evaluating request signals presented to said access control means for vendor and comprehensive parameter values, and for providing in dependence thereon signals which elicit from said vendor data signals which are required to yield signals corresponding to a valid comprehensive model;

means for establishing the validity of the signals presented to said access control means for inclusion into said databases and signals to prompt a vendor for supplemental information signals that complete the signals needed for a valid comprehensive model; and means for generating signals that provide each of a plurality of vendors with access to each other vendor to allow direct presentation of signals corresponding to a comprehensive model having selected values of parameter values.

\* \* \* \* \*